(12) United States Patent
Ernst et al.

(10) Patent No.: US 8,057,147 B2
(45) Date of Patent: Nov. 15, 2011

(54) SELF-DRILLING ANCHOR

(75) Inventors: Richard J. Ernst, San Diego, CA (US);
John P. Grimm, Santee, CA (US);
Mark E. Gonciarz, South Elgin, IL
(US); Cheryl L. Panasik, Elburn, IL
(US)

(73) Assignee: Illinois Tool Works Inc, Glenview, IL (US)

( * ) Notice: Subject to any disclaimer, the term of this patent is extended or adjusted under 35 U.S.C. 154(b) by 437 days.

(21) Appl. No.: 12/167,742

(22) Filed: Jul. 3, 2008

(65) Prior Publication Data

US 2010/0003100 A1    Jan. 7, 2010

(51) Int. Cl.
*F16B 25/10* (2006.01)

(52) U.S. Cl. ................... 411/387.1; 411/411; 411/417

(58) Field of Classification Search ........... 411/386, 411/387.1, 387.3, 387.4, 387.8, 395, 399, 411/409, 411, 424, 417, 421, 423
See application file for complete search history.

(56) References Cited

U.S. PATENT DOCUMENTS

| | | | |
|---|---|---|---|
| 126,366 A | 4/1872 | Wills |
| 252,752 A | 1/1882 | Tower |
| 350,209 A | 10/1886 | Parmelee |
| 516,134 A | 6/1894 | Stilwell |
| 525,752 A | 9/1894 | Tower |
| 927,483 A | 7/1909 | Bradley |
| 984,969 A | 2/1911 | Reiniger |
| 1,031,639 A | 7/1912 | Funderburg |
| 1,051,444 A | 1/1913 | Pleister |
| 1,095,068 A | 4/1914 | Bate |
| 1,184,173 A | 5/1916 | Gehring |
| 1,201,295 A | 10/1916 | Handee |
| 1,248,008 A | 11/1917 | Pleister |
| 1,270,036 A | 6/1918 | LeClaire |
| 1,272,265 A | 7/1918 | Horn |

(Continued)

FOREIGN PATENT DOCUMENTS

DE        0217821 C        5/1909

(Continued)

OTHER PUBLICATIONS

International Searching Authority (ISA), European Patent Office (EPO), International Search Report for PCT/US2007/019419 mailed Oct. 23, 2008.

(Continued)

*Primary Examiner* — Victor Batson
*Assistant Examiner* — Roberta Delisle
(74) *Attorney, Agent, or Firm* — Mark W. Croll; Patricia M. Chidiac; Beem Patent Law Firm (57) ABSTRACT

A self-drilling anchor for use in a friable material or a semi-rigid material comprises a body having an axis, an axial bore adapted to receive a fastener, a proximal end, a drilling end, a proximal portion adjacent the proximal end having high threading having a crest diameter for engaging the friable or semi-rigid material, and a drilling portion adjacent the drilling end, an additional thread proximate the proximal end, the additional thread continuing between turns of the high threading, and a head at the proximal end having an outer diameter that is smaller than the crest diameter. The anchor additional thread is configured to engage either the friable material or, additionally, to firmly engage the semi-rigid material.

8 Claims, 3 Drawing Sheets

U.S. PATENT DOCUMENTS

| | | | |
|---|---|---|---|
| 1,491,203 A | 4/1924 | Enoch | |
| 1,825,419 A | 9/1931 | Plym | |
| 1,963,799 A | 6/1934 | Nelson | |
| 2,026,686 A | 1/1936 | Kirley | |
| 2,093,172 A | 9/1937 | Olson | |
| 2,263,424 A | 11/1941 | Langer | |
| 2,301,181 A | 11/1942 | Ilsemann | |
| 2,400,684 A | 5/1946 | Clark | |
| 2,419,555 A | 4/1947 | Fator | |
| 2,601,872 A | 7/1952 | Kaufmann | |
| 2,654,284 A | 10/1953 | Schevenell | |
| 2,883,720 A | 4/1959 | Hansen | |
| 3,049,323 A | 8/1962 | Peterka | |
| 3,117,486 A | 1/1964 | Matthews | |
| 3,183,531 A | 5/1965 | McKewan | |
| 3,199,398 A | 8/1965 | Tibor Weisz | |
| 3,263,949 A | 8/1966 | Conrad | |
| 3,295,579 A | 1/1967 | Medal | |
| 3,318,182 A | 5/1967 | Carlson | |
| 3,385,156 A | 5/1968 | Polos | |
| 3,404,476 A | 10/1968 | Hoffman, Jr. | |
| 3,522,756 A | 8/1970 | Von Wolff | |
| 3,578,762 A | 5/1971 | Siebol | |
| 3,595,124 A | 7/1971 | Lindstrand et al. | |
| 3,641,866 A | 2/1972 | Mortensen | |
| 3,662,644 A | 5/1972 | Flesch et al. | |
| 3,667,526 A | 6/1972 | Neuschotz | |
| 3,711,138 A | 1/1973 | Davis | |
| 3,752,030 A | 8/1973 | Steurer | |
| 3,882,917 A | 5/1975 | Orlomoski | |
| 3,911,781 A | 10/1975 | Bappert | |
| 4,003,287 A | 1/1977 | Ziaylek, Jr. | |
| 4,024,899 A | 5/1977 | Stewart | |
| 4,075,924 A | 2/1978 | McSherry et al. | |
| 4,202,244 A | 5/1980 | Gutshall | |
| 4,221,154 A | 9/1980 | McSherry | |
| 4,233,881 A | 11/1980 | Carrier | |
| 4,252,168 A | 2/1981 | Capuano | |
| 4,298,298 A | 11/1981 | Pontone | |
| 4,322,194 A | 3/1982 | Einhorn | |
| 4,323,326 A | 4/1982 | Okada et al. | |
| 4,441,619 A | 4/1984 | Gibitz | |
| 4,488,843 A | 12/1984 | Achille | |
| 4,537,185 A | 8/1985 | Stednitz | |
| 4,601,625 A | 7/1986 | Ernst et al. | |
| 4,642,012 A | 2/1987 | Blucher et al. | |
| 4,653,489 A | 3/1987 | Tronzo | |
| 4,708,552 A | 11/1987 | Bustos | |
| 4,712,957 A | 12/1987 | Edwards et al. | |
| 4,763,456 A | 8/1988 | Giannuzzi | |
| 4,844,676 A * | 7/1989 | Adamek | 411/386 |
| 4,856,951 A | 8/1989 | Blucher et al. | |
| 4,871,289 A | 10/1989 | Choinire | |
| 4,892,429 A | 1/1990 | Giannuzzi | |
| 5,039,262 A | 8/1991 | Giannuzzi | |
| 5,044,853 A | 9/1991 | Dicke | |
| 5,047,030 A | 9/1991 | Draenert | |
| 5,059,077 A | 10/1991 | Schmid | |
| 5,098,435 A | 3/1992 | Stednitz et al. | |
| 5,145,301 A | 9/1992 | Yamamoto | |
| 5,160,225 A | 11/1992 | Chern | |
| 5,161,296 A | 11/1992 | Garfield et al. | |
| 5,190,425 A | 3/1993 | Wieder et al. | |
| 5,226,766 A | 7/1993 | Lasner | |
| 5,234,299 A | 8/1993 | Giannuzzi | |
| 5,267,423 A | 12/1993 | Giannuzzi | |
| 5,308,203 A | 5/1994 | McSherry et al. | |
| 5,340,254 A * | 8/1994 | Hertel et al. | 411/311 |
| 5,340,362 A | 8/1994 | Carbone | |
| 5,372,346 A | 12/1994 | Upchurch et al. | |
| 5,403,137 A | 4/1995 | Grun et al. | |
| 5,413,444 A | 5/1995 | Thomas et al. | |
| 5,449,257 A | 9/1995 | Giannuzzi | |
| 5,482,418 A | 1/1996 | Giannuzzi | |
| 5,529,449 A | 6/1996 | McSherry et al. | |
| 5,536,121 A | 7/1996 | McSherry | |
| 5,558,479 A | 9/1996 | McElderry | |
| 5,562,672 A | 10/1996 | Huebner et al. | |
| 5,625,994 A | 5/1997 | Giannuzzi | |
| 5,690,454 A | 11/1997 | Smith | |
| 5,692,864 A | 12/1997 | Powell et al. | |
| 5,693,099 A | 12/1997 | Harle | |
| 5,752,792 A | 5/1998 | McSherry | |
| 5,779,417 A * | 7/1998 | Barth et al. | 411/412 |
| 5,833,415 A | 11/1998 | McSherry | |
| 5,882,162 A | 3/1999 | Kaneko | |
| 5,944,295 A | 8/1999 | McSherry | |
| 5,991,998 A | 11/1999 | Kaneko | |
| 6,003,691 A | 12/1999 | Owen | |
| 6,030,162 A * | 2/2000 | Huebner | 411/413 |
| 6,042,314 A * | 3/2000 | Guelck | 411/399 |
| 6,045,312 A * | 4/2000 | Hsing | 411/412 |
| 6,048,343 A | 4/2000 | Mathis et al. | |
| 6,079,921 A | 6/2000 | Gauthier et al. | |
| 6,086,303 A * | 7/2000 | Fluckiger | 411/399 |
| 6,139,236 A | 10/2000 | Ito | |
| 6,186,716 B1 | 2/2001 | West et al. | |
| 6,196,780 B1 | 3/2001 | Wakai et al. | |
| 6,214,012 B1 | 4/2001 | Karpman et al. | |
| 6,250,865 B1 | 6/2001 | McSherry | |
| 6,264,677 B1 | 7/2001 | Simon et al. | |
| 6,280,675 B1 | 8/2001 | Legrand | |
| 6,354,779 B1 | 3/2002 | West et al. | |
| 6,361,258 B1 | 3/2002 | Heesch | |
| 6,382,892 B1 | 5/2002 | Hempfling | |
| 6,419,436 B1 | 7/2002 | Gaudron | |
| 6,484,888 B2 | 11/2002 | Miller | |
| 6,676,350 B1 | 1/2004 | McSherry et al. | |
| 6,755,835 B2 | 6/2004 | Schultheiss et al. | |
| 6,846,142 B2 | 1/2005 | Gens | |
| 6,854,942 B1 * | 2/2005 | Hargis | 411/369 |
| 6,979,163 B2 * | 12/2005 | Brletich et al. | 411/418 |
| 7,040,850 B2 | 5/2006 | Gaudron | |
| 7,101,133 B2 * | 9/2006 | Dicke | 411/387.4 |
| 7,160,074 B2 | 1/2007 | Ernst et al. | |
| 7,266,874 B2 | 9/2007 | Ernst et al. | |
| 7,290,972 B2 * | 11/2007 | Gauthier | 411/387.1 |
| 7,713,013 B2 * | 5/2010 | Sedgwick et al. | 411/411 |
| 2003/0007845 A1 * | 1/2003 | Gens | 411/411 |
| 2004/0146377 A1 | 7/2004 | Chen | |
| 2005/0031434 A1 | 2/2005 | Gaudron | |
| 2005/0069396 A1 * | 3/2005 | Wu | 411/411 |
| 2005/0079027 A1 | 4/2005 | Ernst et al. | |
| 2005/0084360 A1 | 4/2005 | Panasik et al. | |
| 2005/0158149 A1 * | 7/2005 | Panasik et al. | 411/411 |
| 2005/0175429 A1 | 8/2005 | Panasik et al. | |
| 2006/0018730 A1 | 1/2006 | Ernst | |
| 2006/0127199 A1 * | 6/2006 | Bappert | 411/411 |

FOREIGN PATENT DOCUMENTS

| | | |
|---|---|---|
| DE | 0274731 | 5/1914 |
| DE | 0545634 C | 3/1932 |
| DE | 03704089 | 8/1988 |
| DE | 04016724 | 11/1991 |
| DE | 04121751 | 1/1993 |
| DE | 04122950 | 1/1993 |
| DE | 09301098 | 3/1993 |
| DE | 29502052 | 3/1995 |
| DE | 04343329 | 6/1995 |
| DE | 04439973 | 6/1995 |
| DE | 29509487 | 8/1995 |
| DE | 19852339 | 5/2000 |
| DE | 20111194 | 9/2001 |
| DE | 10038016 | 2/2002 |
| EP | 0305417 | 3/1989 |
| EP | 0400 535 | 12/1990 |
| EP | 0425358 | 5/1991 |
| EP | 0428127 | 5/1991 |
| EP | 0434604 | 6/1991 |
| EP | 0516569 | 12/1992 |
| EP | 0575295 | 12/1993 |
| EP | 0669471 | 8/1995 |
| EP | 0874165 | 10/1998 |
| EP | 0951869 | 10/1999 |
| EP | 0965767 | 12/1999 |
| EP | 1001178 A2 | 5/2000 |
| EP | 1004781 | 5/2000 |

| | | | |
|---|---|---|---|
| EP | 1050689 | | 8/2000 |
| EP | 01036949 | A1 | 9/2000 |
| EP | 01036949 | B1 | 2/2003 |
| EP | 1298331 | B1 | 4/2003 |
| EP | 12522744 | | 4/2005 |
| FR | 2588332 | | 4/1987 |
| FR | 439 431 | | 9/1996 |
| GB | 0413027 | | 7/1934 |
| GB | 1141913 | | 2/1969 |
| GB | 1166262 | | 10/1969 |
| GB | 1487032 | | 9/1977 |
| GB | 2208417 | | 3/1989 |
| GB | 2357130 | | 6/2001 |
| JP | 2005121224 | | 5/2005 |
| WO | WO 96/16273 | | 5/1996 |
| WO | WO 99/05420 | | 2/1999 |
| WO | WO 00/25030 | | 3/2000 |
| WO | WO 2004/053341 | | 6/2004 |
| WO | WO 2004/079209 | | 9/2004 |
| WO | WO 2004/079210 | | 9/2004 |
| WO | WO 2005/038275 | | 4/2005 |
| WO | WO 2005/038275 | A1 | 4/2005 |
| WO | WO 2006/031421 | | 3/2006 |
| WO | WO 2006/135558 | A3 | 12/2006 |

OTHER PUBLICATIONS

ISA, PCT International Search Report and Written Opinion, International Application No. PCT/US2009/045790, Mailing date Sep. 1, 2009.

Ernst et al., U.S. Appl. No. 10/844,706, filed May 12, 2004, "Self-Drilling Anchor".

Panasik et al., U.S. Appl. No. 10/934,913, filed Sep. 3, 2004, "Self-Drilling Anchor".

Ernst et al., U.S. Appl. No. 11/148,158, filed Jun. 8, 2005, "Drywall Fastener".

Ernst et al., U.S. Appl. No. 11/215,651, filed Aug. 30, 2005, "A Method of Making a Self-Drilling Anchor".

Ernst et al., U.S. Appl. No. 11/245,385, filed Oct. 6, 2005, "Garage Hook".

Ernst et al., U.S. Appl. No. 11/832,311, filed Aug. 1, 2007, "Drywall Fastener".

ISA, International Search Report, Sep. 6, 2006, International Application No. PCT/US2006/020692.

ISA, International Search Report, Oct. 24, 2006, International Application No. PCT/US2006/020693.

ISA, International Search Report, Jan. 25, 2006, International Application No. PCT/US2005/030652.

ISA, International Search Report, Jan. 27, 2005, International Application No. PCT/US2004/032281.

ISA, International Search Report, Jan. 11, 1999, International Application No. PCT/CA1998/00717.

French Search Report, 2 pages.

SPIT Mini DRIVA product sheet, Nov. 23, 2004, 1 page.

SPIT, Mini Drive, website http://www.spit.fr/prpoduits/imprProd.php?prod=31&langue=fr, Mar. 10, 2005, France, 1 page.

Current Solutions, revised, "Existing Garage Hook Solution Summary", 5 pages.

International Searching Authority (ISA), European Patent Office (EPO), International Search Report for PCT/US2009/045790 mailed Jan. 7, 2010.

* cited by examiner

SELF-DRILLING ANCHOR

BACKGROUND OF THE INVENTION

1. Field of the Invention

The present invention is directed to an anchor for use in either a friable material, particularly to a self-drilling anchor to be used in drywall mounted to a member or in a relatively thin semi-rigid material such as a hollow door.

2. Description of the Related Art

Because drywall is a friable material, mounting articles thereto can be difficult. In the past, at least three methods have been used. For light weight articles, small plastic expansion anchors have been used. These expansion anchors have typically required three steps to install: first, a hole is drilled into the drywall; second, the anchor insert is driven into the drilled hole; and finally, a threaded fastener is advanced into the anchor, spreading the anchor into engagement with the drywall. However, expansion anchors can typically hold light loads only.

For heavy duty applications, toggle bolts have been used. While toggle bolts have been effective, they are also generally expensive because they involve parts which must move relative to one another. Toggle bolts also have been known to be difficult to install.

Self-drilling anchors for mounting heavier loads also have been used. These self-drilling anchors typically are installed by drilling into the drywall with the anchor itself. The anchor also includes threading having a high thread height to provide a high pullout in the drywall. Examples of self-drilling anchors include the anchor sold under the trademark E-Z ANCOR manufactured by ITW Buildex, and those disclosed in U.S. Pat. Nos. 4,601,625, 5,190,425, and 5,558,479, all of which are assigned to the assignee of this application.

Self-drilling anchors have proved effective for holding higher loads when installed in drywall alone. However, in most cases the drywall is mounted to wood support members, or studs, that are unseen by the user, and typically the location of these support members are unknown and unchecked by the user. When a user of a typical self-drilling fastener attempts to install the anchor in drywall at a location of a support member, the anchor is unable to drill into the support member, causing the anchor to spin in place so that the anchor's high threading strips out the drywall, resulting in failure of the anchor and creating an unsightly scar on the wall. Even if the anchor is able to drill into the support member slightly, the anchors have been known to tightly engage the support member and break due to torsion on the anchor.

Drywall anchors typically have a head or flange that is larger than the outer diameter of the drywall threading to prevent the anchor from being driven through the drywall as the anchor is installed. However, large anchor heads have been known to displace drywall as the anchors are driven, causing drywall at the surface to bulge up around the anchor, conventionally referred to as blistering of the drywall. The large outer diameter of the drywall threading may also cause displacement of drywall leading to blistering. Blistering creates puffing at the drywall surface which is unsightly and unappealing and may make it difficult to mount some articles to drywall so that the article is flush with the drywall surface.

Mounting self-drilling anchors to relatively thin semi-rigid materials such as a veneered panel of a hollow door can also be difficult. The small thickness of the material and the splintering caused during driving may significantly reduce the holding strength of the anchor.

What is needed is a self-drilling anchor for use in a variety of substrates such as drywall or hollow doors that reduces drywall blistering or securely fastens to the hollow door without reducing holding strength.

BRIEF SUMMARY OF THE INVENTION

In one embodiment a body having an axis, an axial bore adapted to receive a fastener, a proximal end, a drilling end, a proximal portion adjacent the proximal end having high threading having a crest diameter for engaging the friable or semi-rigid material, and a drilling portion adjacent the drilling end, an additional thread proximate the proximal end, the additional thread continuing between turns of the high threading, and a head at the proximal end having an outer diameter that is smaller than the crest diameter. The additional thread may have a thread height substantially similar to a thread height of the high threading. The additional thread may also have a leading end, a terminal end and a circumferential extent of about 180 degrees. In addition, the high threading may have a terminal end and the high threading terminal end and the additional thread terminal end may be offset by about 180 degrees and may be substantially similarly spaced from an upper surface of the head, preferably about $\frac{1}{16}$ inch from the upper surface. Additionally or alternatively, the additional thread and the high threading may have flats extending generally perpendicular to the axis, and the flats may be generally axially aligned.

These and other features and advantages are evident from the following description of the present invention, with reference to the accompanying drawings.

DETAILED DESCRIPTION OF THE INVENTION

Referring to FIGS. 1-7, a novel self-drilling anchor 10 is shown. Anchor 10 is for use in a friable material, such as drywall 1, mounted on a member, such as a support member 2, the novel anchor 10 having an elongated body 12 with an axis 6, an axial bore 8 adapted to receive an elongated mounting fastener 4, a flared end 14 having torque transmitting surfaces 15 therein, a proximal portion 18 proximate flared end 14, an intermediate portion 20, a distal portion 22, and a drilling tip 16 generally opposite flared end 14, wherein proximal portion 18 has a threaded exterior, such as drywall gripping threading 19, having a root 26, a crest 27 with a crest diameter DC, and a thread height DH, intermediate portion 20 has a threaded exterior, such as member gripping threading 21, having a root 28, a crest 29 with a crest diameter MC substantially smaller than drywall gripping threading crest diameter DC, and a thread height MH substantially smaller than drywall gripping thread height DH, and distal portion 22 has a threaded exterior, such as drilling threading 23, having a root 30 that tapers toward drilling tip 16, a crest 31 with a crest diameter TC substantially smaller than drywall gripping threading crest diameter DC, and a thread height TH substantially smaller than drywall gripping thread height DH.

Anchor 10 is for driving into drywall 1 for mounting an article 3 to drywall 1 or for mounting an article to a semi-rigid material 7 such as the panel of a hollow core door. After anchor 10 is installed, a mounting fastener 4 is inserted through article 3 and into bore 8 of anchor 10. Anchor 10 provides stronger engagement and higher pullout strength than mounting fastener 4 alone. Anchor 10 can be used in a manner similar to traditional self-drilling anchors when it is being installed in drywall 1 only. However, anchor 10 includes features that allow anchor 10 to penetrate and engage in a support member 2, such as a wood support stud, and that provide added strength to withstand the large forces of driving anchor 10 into drywall 1 and support member 2. Moreover, anchor 10 provides features that allow anchor 10 to firmly engage in just a semi-rigid material such as a hold core door panel.

The friable material can be one of several friable materials used in construction wherein it is desired to mount an article 3 to the friable material in order to increase the amount of load that the friable material can withstand. An example of the friable material is gypsum based drywall 1, such as the gypsum drywall sold under the trademark SHEETROCK by United States Gypsum. Drywall 1 typically has a thickness T of ½ inch or ⅝ inch, but it can be obtained in other thicknesses, such as ⅜ inch.

The semi-rigid material 7 can also be one of several often-used materials. For example, it may be a thin piece of solid wood, fiberboard, plywood, or multiple materials having a veneer coating. The semi-rigid material may come in a variety of thicknesses, but may generally be between about 1/16 inch and about ⅛ inch.

Typically, friable materials such as drywall 1 are mounted to a member, such as a wood structural support member, plywood, or another friable material, such as another layer of drywall. The member can be a support member 2, such as a wood support member, for example a 2×4 stud or the like, evenly spaced from other wood studs, e.g. every 16 inches, or a metal support member, such as a steel support stud. Support members are substantially more resistant to pullout than drywall 1 because they are much less likely to break apart. Although anchor 10 can be used on drywall 1 mounted to another sheet of drywall, or other friable materials, the present invention will be described for use with support members 2 such as a wood support stud.

Mounting fastener 4 is preferably a threaded fastener, such as a mounting screw, having an elongate shank 34 with a head 35 at one end and a tip 36 at the other. Shank 34 of mounting fastener 4 includes threading 5 which engages with interior bore 8 of anchor 10. Threading 5 of mounting fastener 4 can be of a standardized thread form, such as Unified Coarse (UNC) or Unified Fine (UNF) threading, or threading 5 can be of a specialized thread form. Mounting fastener 4 can be a standard #6, #7 or #8 UNC screw, wherein head 35 has a Phillips recess, and a total elongate length FL of between about ½ inch inches and about 2 inches or more, preferably about 1¼ inches. Mounting fastener 7 can have a thread density of between about 8 threads per inch and about 18 threads per inch, preferably about 15 threads per inch.

Mounting fastener 4 can have different lengths to accommodate different thicknesses AT of article 3. Preferably, anchor 10 is designed so that a long mounting fastener 4 can be used with anchor 10 if article 3 is relatively thin or relatively thick, in which case there is a need for greater length to achieve engagement with anchor 10. A shorter anchor 10 is preferred because it limits the depth of embedment in support member 2, thereby reducing the associated installation torque, and because it is less expensive to manufacture, easier to handle and to keep stable during installation, and it has a shorter drive time so that a user can install a plurality of anchors 10 in a relatively short period of time with a minimum of effort. Moreover, in hollow door applications, a shorter anchor 10 is preferred so as to avoid piercing the panel on the other side of the door.

Anchor

Figure 2:
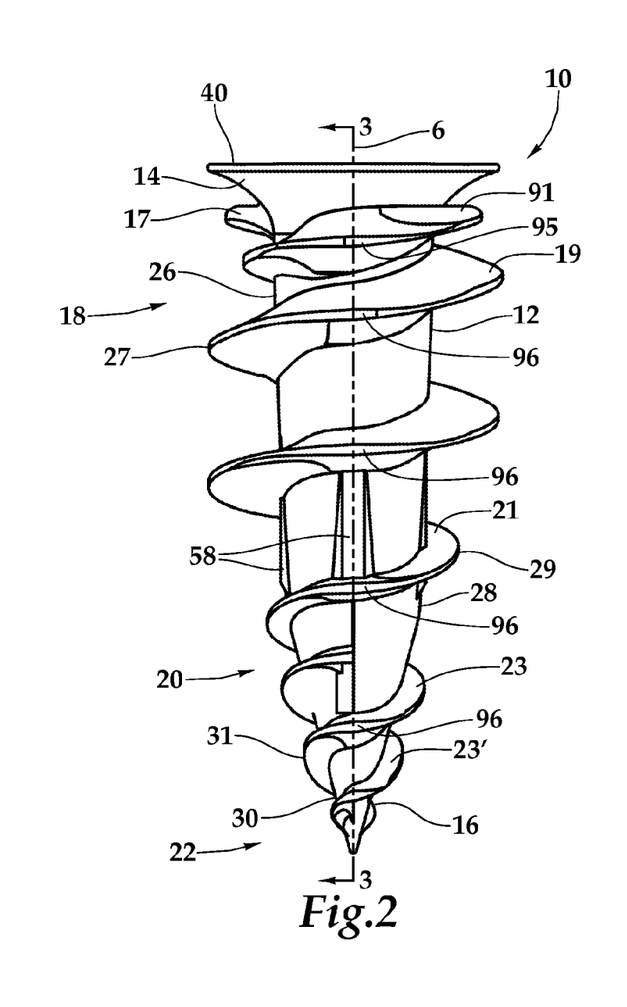
FIG. 2 is a side view of the self drilling anchor of FIG. 1.
Figures 3, 4, 5:
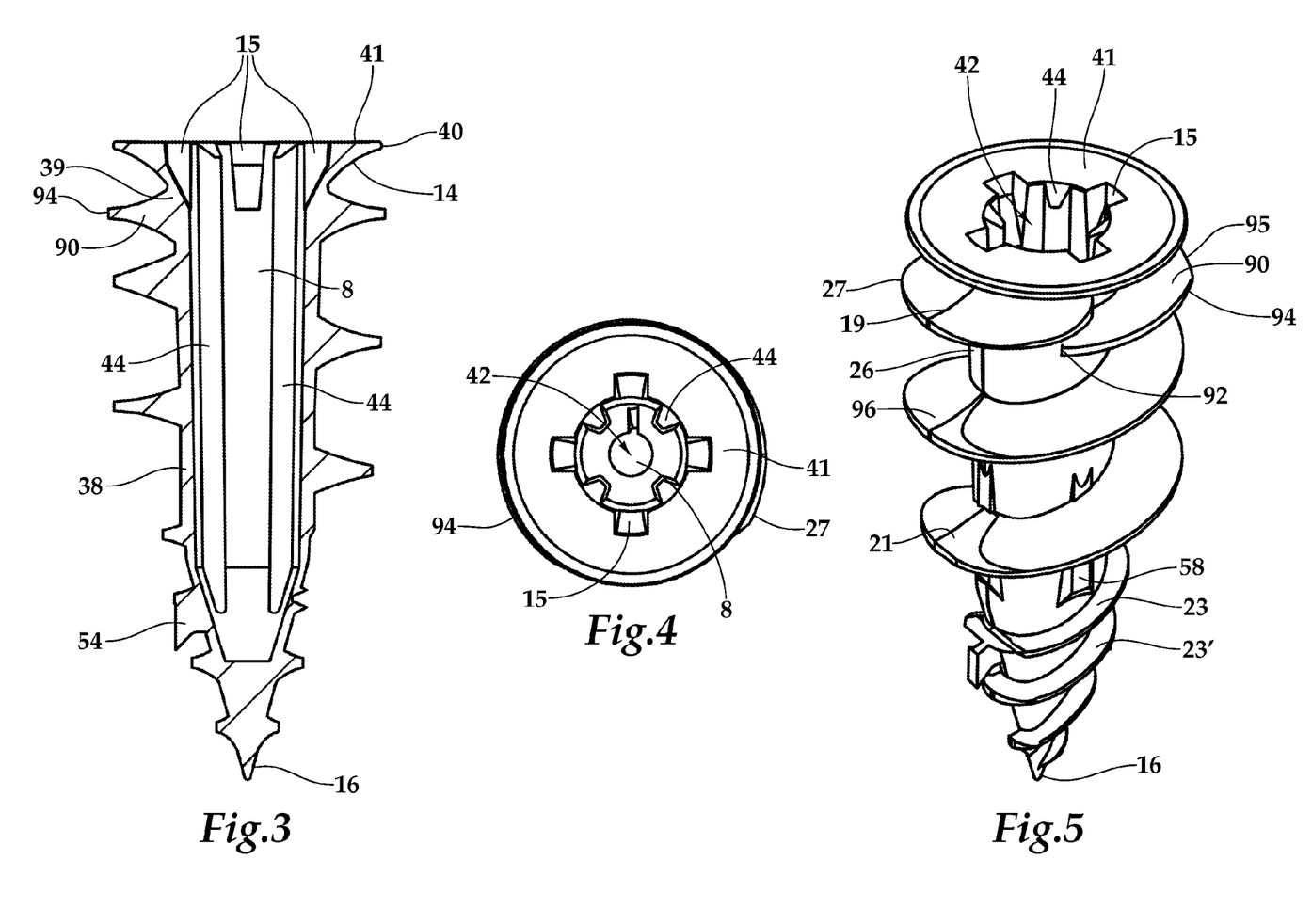
FIG. 3 is a side-sectional view of the self drilling anchor of FIG. 2 taken through the line A-A.
FIG. 4 is a top view of the self drilling anchor of FIG. 1.
FIG. 5 is a perspective view of the self drilling anchor of FIG. 1.
Figure 7:
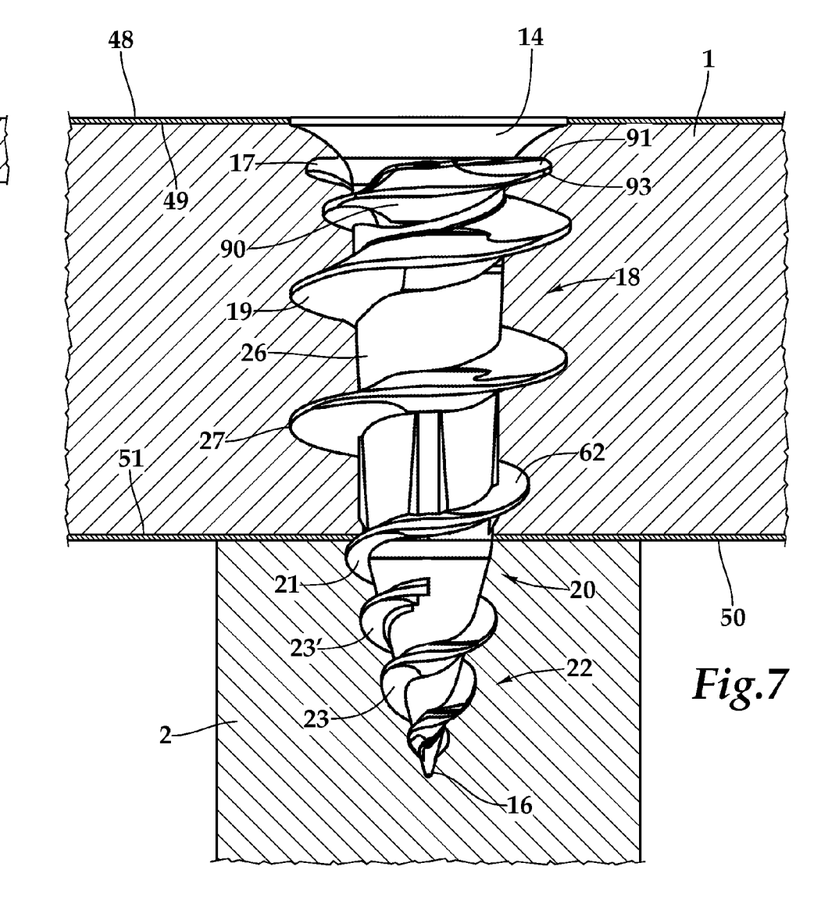
FIG. 7 is a side view of the self drilling anchor installed in a friable material mounted to a support member.

Turning to FIGS. 2, 3, and 7, anchor 10 includes a generally hollow elongate body 12 having an axis 6, a thin wall 38 surrounding an axial bore 8 adapted to receive mounting fastener 4, wherein axial bore 8 has an elongated generally cylindrical portion and a set of splines 44 adapted to receive elongated threaded mounting fastener 4. A flange 40 is located at flared end 14 of body 12, wherein flange 40 includes torque transmitting surfaces therein, such as surfaces 15 in a Phillips-type recess 42, which may be a Phillips Square Drive to minimize cam-out, an axially extending proximal portion 18 proximate flared end 14, an axially extending intermediate portion 20 between proximal portion 18 and distal portion 22, an axially extending distal portion 22, and a drilling tip 16 generally opposite flared end 14, wherein intermediate portion 20 tapers toward distal portion 22 and distal portion 22 tapers toward drilling tip 16. Anchor 10 is preferably manually drivable by a hand-powered screwdriver, which may be a Phillips screwdriver or the like, or by a power driver.

Figure 1:
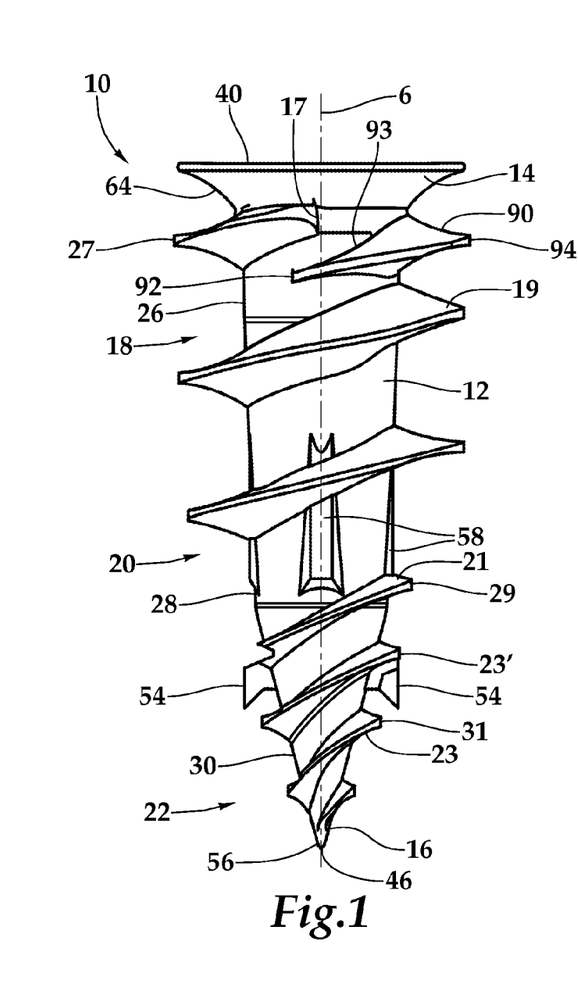
FIG. 1 is a front view of a self drilling anchor according to the present invention.

In the embodiment shown in FIGS. 1-3, anchor body 12 includes a first exterior thread 19, 21, 23' disposed on proximal portion 18, intermediate portion 20, and distal portion 22 and a second exterior thread 23" disposed on distal portion 22, where second exterior thread 23" is between first exterior thread 23' on distal portion 22. Both first exterior thread 19, 21, 23' and second exterior thread 23" have a crest and a lead 56 proximate drilling tip 16. First exterior thread 19 at proximal portion 18 has a crest diameter DC and a high thread height DH for gripping drywall 1 or semi-rigid material 7. First exterior thread 21 at intermediate portion 20 has a crest diameter MC substantially smaller than crest diameter DC and a thread height MH substantially smaller than the high thread height DH. First exterior thread 23' at distal portion 22 has a crest diameter TC substantially smaller than crest diameter DC and a thread height TH substantially smaller than the high thread height DH. There is a transition zone 62 on first thread 19, 21, 23' between the high thread height DH and the thread height MH. Second exterior thread 23" has a crest diameter TC substantially smaller than crest diameter DC and a thread height TH substantially smaller than the high thread height DH.

Preferably anchor 10 has a means for permitting mounting fastener tip 36 to extend beyond the original position of drilling tip 16 of anchor 10 when anchor 10 is installed. Anchor 10 can have a thin wall 38 to allow mounting fastener 4 to pierce through anchor 10 so that mounting fastener tip 36 can extend past drilling tip 16 of anchor 10. Thin wall 38 allows the root diameter of anchor 10 to be smaller, resulting in a lower required installation torque. Additionally, thin wall 38 allows anchor 10 to receive mounting fasteners 4 having relatively large outer diameters, while still having an anchor 10 with a relatively small root. For example, if wall 38 has a thickness of about 0.02 inch, and a set of splines 44 that are large enough, as described below, anchor 10 can receive a #6 threaded mounting fastener, having an outer diameter of about 0.14 inch, or a #8 threaded mounting fastener, having an outer diameter of about 0.16 inch without the mounting fastener threading 5 tapping into wall 38. Also, thin wall 38 allows anchor 10 to be made from less material so that anchor 10 is less expensive to manufacture. In one embodiment, the thickness of anchor wall 38 is between about 0.01 inch and about 0.05 inch, preferably between about 0.015 inch and about 0.03 inch, still more preferably about 0.025 inch.

In the embodiment shown in FIGS. 3 and 4, splines 44 are included in bore 8 of anchor 10 for engaging with mounting fastener 4. Mounting fastener threading 5 taps mating threads 45 into splines 44 so that mounting fastener 4 is threadingly engaged with splines 44, and hence with anchor 10. Splines 44 also add structural support to anchor 10 so that body 12 of anchor 10 can withstand higher torsion forces when driven through drywall 1 and support member 2. Splines 44 may extend along a length of bore 8 and may preferably extend substantially along the entire length of bore 8.

The effective inner diameter of bore 8 with splines 44 should be smaller than the outside diameter, or crest diameter of mounting fastener 4, but not as small as the root diameter of mounting fastener 4, so that splines 44 are tapped by mounting fastener 4 to form mating threads 45. Preferably, the height of splines 44 from the interior of wall 38 is selected so that the effective inner diameter of bore 8 is small enough so that the threading of a #6 threaded mounting fastener 4, with an outer diameter of about 0.136 inch, can tap splines 44, and so that the inner diameter of wall 38 is large enough so that the threading of a #8 threaded mounting fastener 4, having an outer diameter of about 0.164 inch, only taps splines 44 and does not tap wall 38. In a preferred embodiment, bore 8 has an inner diameter at wall 38 of between about 0.17 inch and about 0.21 inch, preferably between about 0.18 inch and about 0.2 inch, still more preferably about 0.19 inch, and splines 44 have a height of between about 0.015 inch and about 0.045 inch, preferably between about 0.025 inch and about 0.035 inch, still more preferably about 0.03 inch, so that the effective inner diameter of bore 8 at splines 44 is between about 0.11 inch and about 0.16 inch, preferably between about 0.12 inch and about 0.145 inch, still more preferably about 0.13 inch.

Anchor 10 is made from a material that is strong enough to withstand the torsional forces of driving anchor 10 into drywall 1 and support member 2 under normal conditions, yet malleable enough to be tapped by threaded mounting fastener 4. The material of anchor 10 is preferably pierceable or breakable by mounting fastener 4 so that tip 36 of mounting fastener 4 will be able to extend past drilling tip 16 of anchor 10. Also, anchor 10 should be made from a material that can easily and inexpensively be formed into the specific geometry of anchor 10. Anchor 10 can be made from a metal or metal alloy that can be die cast into the shape of anchor 10, such as tin based alloys, aluminum based alloys, magnesium based alloys, copper, bronze or brass alloys, and zinc based alloys. In one embodiment, anchor 10 is made from a zinc alloy, such as Zamac 1.

Anchor 10 can also be made from plastic or other polymeric materials, e.g. an engineered plastic such as Delron, nylon, and nylon with fillers, such as glass filled nylon. However, anchor 10 should be made to be strong enough to withstand the torsional forces of driving anchor 10 into drywall 1 and support member 2.

Distal Portion

Turning back to FIGS. 1-4, distal portion 22 allows anchor 10 to drill through drywall 1 and support member 2 as it may be driven manually by a user so that a separate pre-drilling step is not needed. Distal portion 22 includes a drilling tip 16, and in a preferred embodiment, as shown in FIG. 2, drilling tip 16 is generally conical in shape and is coaxial with body 12 so that drilling tip 16 comes to point 46 at body axis 6. Preferably, drilling tip 16 includes a sharp point 46 to guidedly and quickly engage surface 48 of drywall 1 and the front surface of support member 2.

Distal portion 22 includes a threaded exterior having drilling threading 23 disposed on distal portion 22 for engaging drywall 1 and support member 2. Drilling threading 23 includes a root 30 and a crest 31 having a crest diameter TC substantially smaller than drywall gripping threading crest diameter DC, and a thread height TH substantially smaller than drywall gripping thread height DH. Drilling thread height TH is also small enough so that the installation torque into support member 2 may be achieved manually by the typical user so that anchor 10 can be driven into support member 2. Threading 23 can also include a radius of curvature between the base of the thread 23 and root 30, best seen in FIG. 3, to prevent the formation of stress concentrations at base of thread 23.

Continuing with FIGS. 1-3, drilling threading root 30 tapers from intermediate portion 20 toward drilling tip 16 so that the cross sectional area of drilling threading root 30 proximate drilling tip 16 is reduced with respect to the cross sectional area at intermediate portion 20. Thread height TH of drilling threading 23 remains substantially constant along the length of distal portion 22. However, because root 30 is relatively small, particularly at drilling tip 16, thread height TH can be larger, for example larger than thread height MH of member gripping threading 21, because the small root 30 allows a larger thread height without an overly large crest diameter TC.

Distal portion threading 23 and intermediate portion threading 21 engage drywall 1 and drive anchor 10 through drywall 1. If anchor 10 is driven into a location wherein a support member 2 is located behind drywall 1, drilling tip 16 hits support member 2, and if support member 2 is relatively hard with respect to drywall 1, e.g. a wood support stud, then anchor 10 typically spins within drywall 1 without axially advancing into support member 10, referred to herein as stalling. As anchor 10 stalls, distal portion threading 23 and intermediate portion threading 21 drill a hole of a predetermined size in drywall 1 while drilling tip 16 drills into support member 2. Eventually drilling tip 16 drills to a depth into support member 2, usually between about ⅛ inch and about ¼ inch, that allows distal portion threading 23 to engage support member 2 and begin pulling anchor 10 through support member 2 and drywall 1 so that drywall gripping threading 19 can engage drywall 1.

It has been found that the size of the hole drilled into drywall 1 by intermediate portion threading 21 is important in the grip created between drywall and drywall gripping threading 19, particularly if anchor 10 is driven into drywall only. It has been found that for drywall threading having a crest diameter of about ½ inch, it is ideal for the hole drilled in the drywall to have a diameter of about ¼ inch. Therefore, distal portion 22 is designed to drill out a hole in drywall 1 that generally maximizes to the extent practically attainable the pullout strength of anchor 10 in drywall 1.

Turning to FIG. 1, distal portion 22 can include at least one wing 54 that protrudes radially outwardly from distal portion 22 to ream out drywall 1 to form a hole having a predetermined diameter selected to maximize pullout strength in drywall 1, particularly when anchor 10 is driven into drywall 1 only, with no support member 2 behind the installation location. Preferably, wing 54 extends to a distance from axis 6 that is approximately equal to the root radius of proximal portion 18 near flange 40, wherein the root radius is half of the root diameter DR. Wings 54 are designed to break away when they hit support member 2 so that wings 54 do not ream out support member 2, but only ream out drywall 1.

In the embodiment shown in FIG. 1, distal portion 22 includes a pair of wings 54 that protrude radially outwardly from distal portion 22. Wings 54 are generally evenly spaced around the perimeter of distal portion 22 so each of a pair of wings 54 are about 180° apart. Wings 54 protrude radially outwardly so that a width WW across wings 54 is approximately equal to root diameter DR of proximal portion 18 near flange 40. It is preferred that the hole reamed out by wings 54 be approximately equal to root diameter DR so that wings 54 ream out only as much drywall 1 as is necessary, leaving behind a maximum amount of drywall 1 for engagement with drywall gripping threading 19. Wings 54 may be integral with body 12, drilling threading 23 or 23' or both. Wings 54 may be similarly shaped. However, the intersection of a wing 54 with drilling threading 23 or 23' may alter the shape of one wing 54 in comparison to another. In one embodiment, one wing 54 may be generally co-terminus with a trailing end of second drilling threading 23' which may serve to effectively increase the axial extent of wing 54. Alternatively or additionally, drilling threading 23 may have a notch 24 above the other wing 54. Notch 24 may be localized to the area over drilling threading 23 but may further have a circumferential extent of about ½ turn, preferably about ¼ turn.

If drilling tip 16 hits support member 2, there is a momentary stall as drilling tip 16 drills into support member 2, as described above, so that the threading on anchor 10 begins to strip away a portion of drywall 1. For this reason, it is important that drilling threading 23 engage support member 2 and that distal portion 22 drill into support member 2 quickly so that anchor 10 does not excessively strip out drywall 1 before being driven forward, avoiding the creation of scarring on the surface 48 of drywall 1. Drilling threading 23 extends to an axial position that is as close to drilling tip 16 as possible so that drilling threading 23 can more quickly engage with support member 2. In a preferred embodiment, drilling threading 23 extends substantially to said drilling tip 16 so that a lead 56 of drilling threading 23, shown in FIGS. 1, 2, and 5, is axially spaced from drill tip point 46 by between about 0 inches, wherein drilling threading 23 extends substantially all the way to drilling tip 16, and about 0.06 inch. Ideally, it is preferred that drilling threading 23 extends all the way to drilling tip 16, i.e. no space between tip point 46 and lead 56, however, it has been found that for a drilling tip that comes to a point, wherein the root essentially has a diameter of 0 inches, the drilling threading actually becomes axial, which can make it difficult for the drilling threading to engage support member 2. For this reason, lead 56 of drilling threading 23 can be spaced slightly from drilling tip 16, e.g. at about 0.02 inch.

Anchor 10 should have enough structural strength to withstand high torsional forces without collapsing, particularly at drilling tip 16. The potential for anchor 10 to collapse is exacerbated by thin wall 38 described above, which provide little support against the high torsion forces experienced by anchor 10 when driving into support member 2. For this reason, anchor 10, and especially drilling tip 16, includes strengthening elements. Drilling threading 23 provides a structural strengthening effect on drilling tip 16. This structural strengthening is important because of the high torsional forces associated with driving anchor 10 into support member 2 or semi-rigid material 7, especially since anchor wall 38 is thin and do not provide much structural support by itself.

Continuing with FIGS. 1 and 2, external threading 23 of distal portion 22 can include two generally helical threads 23, 23' arranged in a double helix. The double helix configuration of threads 23, 23' provides added support around distal portion 22 to help prevent distal portion 22 from collapsing due to the torsional forces of driving anchor 10 into support member 2. Double helix threads 23, 23' also provide balanced driving into support member 2 and faster engagement of drilling tip 16 with support member 2. In addition, the double lead threads 23, 23' extend to an axial position proximate to drilling tip 16 so that anchor 10 can quickly engage and drill into support member 2.

Preferably, each thread 23, 23' of the double helix has substantially the same pitch P so that one of the threads 23, 23' does not overtake the other. Preferably, second thread 23' is spaced axially from first thread 23 by approximately half the pitch P of threads 23, 23', i.e. about 0.1 inch for a pitch P of about 0.2 inch, so that at every axial position along distal portion 22, there is a thread 23, 23' on either side providing structural support. Preferably, threads 23, 23' of double helix have substantially the same thread height TH.

First thread 23 of the double helix may continue as a thread 21 on intermediate portion 20 while second thread 23' is only present on distal portion 22. Both threads 23, 23' can also continue on in a double helix on intermediate portion 20 (not shown) to provide structural support for intermediate portion 20 as well as distal portion 22. If second thread 23' is extended onto intermediate portion 20, it provides improved grip with support member 2.

Intermediate Portion

As described above, it is desirable to allow mounting fastener tip 36 to extend past drilling tip 16 of anchor 10 so that a user can use mounting fasteners 4 of different lengths. However, unless anchor 10 adequately grips support member 2 when mounting fastener 4 begins to drive into support member 2, the rotation of mounting fastener 4 will cause mounting fastener threading 5 to back anchor 10 out of drywall 1, known as "jacking," which can cause complete failure of anchor 10 and can cause drywall gripping threading 19 to scar drywall 1. Resistance to jacking is accomplished by a positive engagement between anchor 10 and support member 2 via member gripping threading 21 and drilling threading 23 when mounting fastener 4 is driven into support member 2. If mounting fastener 4 does not pierce or break through anchor 10, the member gripping strength of intermediate portion 20 is not as critical. However, it is still desirable that anchor 10 adequately engage support member 2 because engagement with support member 2 is the main source of the holding value of anchor 10.

Returning to FIGS. 1 and 2, member gripping threading 21 is disposed on intermediate portion 20 and includes a root 28 and a crest 29 having a crest diameter MC substantially smaller than drywall gripping threading crest diameter DC. In the embodiment shown in FIG. 1, root 28 of intermediate portion 20 is generally frustoconical so that root 28 tapers slightly toward distal portion 22 so that the torque required to install anchor 10 will be minimized, particularly in wood support members, because it allows the root diameter MR and crest diameter MC of intermediate portion 20 to be smaller. In one embodiment, member gripping threading root 28 tapers at an angle of between about ½ degree and about 4 degrees, preferably about 2¼ degree.

It is preferred that the largest crest diameter MC of intermediate portion 20 be selected to maximize the gripping between drywall gripping threading 19 and drywall 1, particularly when anchor 10 is to be installed in drywall only. For example, for an anchor 10 have a drywall gripping threading crest diameter DC of about ½ inch, it is desired that the largest member gripping crest diameter MC be about ¼ inch or smaller.

In contrast to drywall gripping threading 19, described below, member gripping threading 21 has a thread height MH that is substantially smaller than the thread height DH of drywall gripping threading 19. The crest diameter MC of intermediate portion 20 is also substantially smaller than the crest diameter DC of proximal portion 18 so that the required installation torque in a support member 2, such as a wood stud, is not excessive. The crest diameter MC and thread height MH of member gripping threading 21 is preferably selected so that it is small enough that it does not scar or tear drywall 1 when anchor 10 stalls when drilling into support member 2, described above, and so that member gripping threading 21 does not engage drywall 1 during stalling, which would jack drywall 1 away from support member 2. Moreover, a smaller member gripping threading 21 crest diameter MC and thread height MH allow anchor 10 to penetrate and be driven initially into semi-rigid material 7 more quickly and with a smaller installation torque. While anchor 10 is configured to firmly engage a variety of different mounting surfaces, the configuration of intermediate portion 20 is more affected by mounting to support member 2 behind drywall 1 since intermediate portion 20 may be less likely to ultimately engage semi-rigid materials 7 in applications such as mounting to hollow core doors.

Although larger thread heights MH, TH of intermediate portion 20 and distal portion 22 would result in higher pullout strength within support member 2, they would also greatly increase the torque required to drive anchor 10 into wood or other support member materials, making it difficult for a user to install anchor 10, particularly with a hand-driven screwdriver. Therefore, thread height MH, TH should be chosen to allow for an acceptable torque as intermediate portion 20 is driven into support member 2.

In the embodiment shown in FIG. 1, threading 21 of intermediate portion 20 is one generally helical thread 21, is a continuation of drilling thread 23 and extends on to drywall engaging thread 19 (described below). External threading 21 of intermediate portion 20 can also be a double helix similar to the double helix shown in distal portion 22 to provide added structural support on intermediate portion 20. Intermediate threading 21 can also have a radius of curvature between the base of thread 21 and root 28 to prevent the formation of stress concentration along the base of thread 21.

The combined length ML of intermediate portion 20 and distal portion 22 is preferably larger than the thickness T of drywall 1 so that when anchor 10 stalls before beginning to drill into support member 2, the larger crested threading 19 of proximal portion 18 (described below) is not engaged with drywall 1, which would tend to strip out drywall 1 and leave a large scar on front surface of drywall 1. The length ML should also be long enough so that distal portion 22 completes its drilling of drywall 1 before drywall gripping threading 19 begins to engage drywall 1, particularly when anchor 10 is driven into drywall only. This is preferred because drilling into a material tends to axially advance through the material substantially slower than driving through the material with threading. For example, anchor 10 is driven axially through drywall 1 by drywall gripping threading 19 much faster than anchor 10 can drill into drywall 1. If the drilling step is not completed before drywall gripping threading 19 begins to engage drywall 1, then it is likely that drywall gripping threading 19 will strip out drywall 1 rather than drive anchor 10 through it. Additionally, it is important to balance the length ML of intermediate portion 20 and distal portion 22 and the installation torque required to drive anchor 10, particularly into support member 2.

Continuing with the embodiment shown in FIGS. 1 and 2, intermediate portion 20 includes ribs 58 for structural support. Preferably ribs 58 are axially extending and protrude radially outwardly slightly from root 28 of intermediate portion 20. Ribs 58 can also be placed on proximal portion 18 or distal portion 22 to provide more structural support along anchor 10 when drilling and threading into support member 2. Ribs 58 may be wider closer to drilling tip 16 and narrow as ribs 58 extend axially toward flared end 14. This added width may provide greater strength and stability than that provided by other ribs since the additional material closer to drilling tip may strengthen those portions of anchor 10 that experience increased loads during installation, including, for example, the torsion forces on distal portion 22 and intermediate portion 20 that occur when anchor 10 is driven into support member 2. Anchor 10 may have a plurality of ribs 58. Preferably, ribs 58 are generally evenly circumferentially spaced around body 12. In one embodiment, anchor may have 4 ribs incrementally spaced about 90 degrees apart. In one embodiment, ribs 58 protrude radially outwardly from root 28 more at the driving end than at the trailing end of ribs 58, as shown in FIG. 2. In one embodiment, ribs 58 have a length RL of between about 3/16 inch and about 5/16 inch, preferably about 1/4 inch and a width RW of between about 1/32 inch and about 3/32 inch, preferably about 1/16 inch, and ribs 58 protrude from root 28 by about 0.015 inch.

In a preferred embodiment, anchor 10 includes a double helix of drilling threads 23, 23' and axial ribs 58, which cooperate to form a cage or lattice of support around distal portion 22 and intermediate portion 20 to help prevent anchor 10 from collapsing due to the high torsional forces of driving anchor 10 into support member 2. Splines 44 in bore 8, shown in FIG. 3, also add strength to the cage or lattice support structure of anchor 10.

Proximal Portion

Returning to FIGS. 1-4, proximal portion 18 includes a threaded exterior for engagement with drywall 1 when anchor 10 is installed so that the load of article 3 will be supported by drywall 1, particularly if anchor 10 is driven into drywall only. Drywall gripping threading 19 taps a mating thread 60 in drywall 1 so that an engagement between drywall gripping threading 19 and drywall 1 is accomplished. Drywall gripping threading 19 may also be considered panel gripping threading 19 when anchor 10 is installed in a semi-rigid material 7 such as the panel of a hollow core door or proximal portion threading generally.

The threaded exterior includes threading 19 disposed on proximal portion 18 having a crest 27 with a crest diameter DC and a root 26 having a root diameter DR. Proximal portion threading 19 is high threading wherein the distance between crest 27 and root 26, or the thread height DH, is large relative to member gripping threading 21 and drilling threading 23. High proximal portion threading 19 helps to maximize the surface area of proximal portion threading 19 encountered by drywall 1 or semi-rigid material 7, increasing the pullout strength. The thread height DH of proximal portion threading 19 is substantially larger than the thread heights MH, TH of member gripping threading 21 and drilling threading 23, which provides for higher pullout strength in drywall 1 or semi-rigid materials 7. The diameter DC of proximal portion threading crest 27 can remain essentially the same along the entire length of proximal portion 18. In one embodiment, the diameter DC of crest 27 is about twice the diameter DR of root 26.

Turning to FIG. 7, preferably at least approximately 3/4 of a turn of drywall gripping threading 19 is engaged behind drywall 1 so that drywall engaging threading engages the paper 51 on the rear surface 50 of drywall 1. Engaging paper 51 on drywall rear surface 50 is particularly important when driving anchor 10 into drywall only, because it has been found that engagement with paper 51 provides a substantial portion of the grip between anchor 10 and drywall 1. Drywall gripping threading 19 is not intended to be driven into support member 2 because the high drywall gripping threading 19 would require a very high torque to drive anchor 10 into support member 2.

Figure 6:
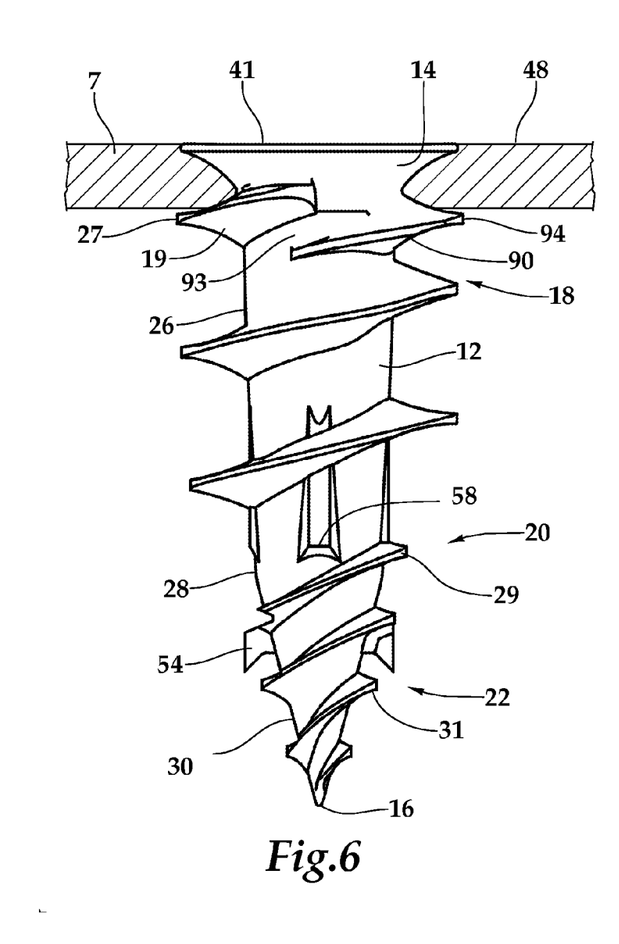
FIG. 6 is a side view of the self drilling anchor installed in a thin, semi-rigid material.

Turning to FIG. 6, preferably between at least approximately ¼ and ½ of a turn of proximal portion threading 19 engages semi-rigid material 7. Proximal portion threading 19 may be spaced from flared end so as to allow for both engagement of proximal portion threading 19 with semi-rigid material 7 as well as compression of semi-rigid material 7 between flared end 14 and proximal portion threading 19.

Returning to FIGS. 1, root 26 of proximal portion 18 can be tapered toward intermediate portion 20 so that root 26 is generally frustoconical, and so that the diameter of root 26 at the top of proximal portion 18 is larger than the diameter of root 26 at the bottom of proximal portion 18. In the embodiment shown in FIG. 2, tapered root 26 of proximal portion 18 and tapered root 28 of intermediate portion 20 are generally continuous and taper at approximately the same angle so that roots 26, 28 lie generally along the same frustocone giving anchor 10 a ballistic or bullet type shape.

In the embodiment shown in FIG. 1, exterior threading 19 of proximal portion 18 is one thread 19 that is a continuation of member gripping thread 21, except that drywall gripping threading 19 has a substantially larger crest diameter DC and a substantially larger thread height DH than the crest diameter MD and thread height MH of intermediate portion 20, see FIGS. 2 and 3. In one embodiment, crest diameter DC of proximal portion 18 is about twice the crest diameter MC of intermediate portion 20. Crest diameter DC may be between about ¼ inch and about ⅝ inch, preferably between about ¼ inch and about ½ inch, still more preferably about 3/8 inch. Thread height MH may be between about 1/16 inch and about ¼ inch, preferably between about 1/16 inch and about 3/16 inch, still more preferably about ⅛ inch. Proximal portion root 26 may be between about ⅛ inch and about ⅜ inch, preferably about ¼ inch.

Preferably, there is a transition zone 62 between intermediate portion 20 and proximal portion 18 wherein the crest diameter and thread height enlarge from member gripping thread 21 to drywall gripping thread 19. In one embodiment, transition zone 62 extends for about ¾ of a thread turn. Drywall gripping threading 19 may be generally helical.

Turning back to FIGS. 1 and 7, the upper end of drywall gripping threading 19 is spaced from flange 40 to form a neck 64 between flange 40 and drywall gripping threading 19. Neck 64 allows upper surface 41 of flange 40 to seat at or below the level of drywall surface 48, as shown in FIG. 4, because the discontinuation of drywall gripping threading 19 at neck 64 before reaching flange 40 creates a space in the threads 60 formed in drywall 1 which allows compression of adjacent material by flange 40. Also, neck 64 ensures that drywall gripping threading 19 is spaced away from paper 49 on drywall surface 48, so that drywall gripping threading 19 does not engage the paper 49 and twist it, creating an undesirable appearance of drywall surface 48. Neck 64 can have a length NL of between about 0.03 inch and about 0.1 inch, preferably about 0.07 inch.

The length DL of proximal portion 18, including flange 40, is preferably slightly larger than the thickness T of drywall 1, preferably so that there is a portion of drywall gripping threading 19 behind drywall rear surface 50 to engage rear surface paper 51. It is important to select the length DL of proximal portion 18 carefully, balancing the length of drywall gripping threading 19 engaging paper 51 on rear surface 50 of drywall 1 with the torque required to drive that length of drywall gripping threading 19 into a support member 2, if anchor 10 is driven into a location where a support member 2 is located. In addition, it is desirable that anchor 10 be usable with different thicknesses of drywall 1, so it is important to remember that a certain length DL of proximal portion 18 may allow threading 19 to engage rear surface paper 51 in one thickness of drywall, but may be too short to engage rear surface paper 51 in a thicker drywall, or conversely, proximal portion 18 may be too long so that too much of drywall gripping threading 19 must be driven into a support member for a thinner drywall, resulting in a higher required installation torque.

The pitch P of drywall gripping threading 19 is chosen so that there preferably is at least one full turn of drywall gripping threading 19 in drywall 1, and preferably between about 1¾ turns and about 2¼ turns, still more preferably about 2 full turns of drywall gripping threading 19 embedded in drywall 1. In one embodiment, for drywall 1 having a thickness of ½ inch or ⅝ inch, the pitch P of drywall gripping threading 19 is between about ⅛ inch and about 0.3 inch, preferably about 0.2 inch. Preferably, the pitch of drywall gripping thread 19 is generally equal to the pitches of member gripping threading 21 and drilling thread 23. In one embodiment (not shown) the pitch of drywall gripping threading 19 proximate transition zone 62 has a larger pitch than the remaining thread 19 proximate flared end 14. When this larger pitched threading engages drywall 1, it pulls anchor 10 into drywall relatively fast, helping to counteract any jacking that may tend to occur.

Tertiary Thread

As shown in FIGS. 1 and 2, anchor 10 may have an additional, tertiary thread 90 proximate flared end 14. Additional thread 90 may have a terminal end 91 circumferentially spaced from a terminal end 17 of proximal portion threading 19. Additional thread 90 may further have a leading end 92 generally circumferentially aligned with a terminal end 17 of proximal portion. Preferably, terminal end 91 of additional thread 90 may each be offset from terminal end 17 of proximal portion threading 19 by between about 120 and about 240 degrees, preferably between about 150 and about 210 degrees, still more preferably about 180 degrees.

Offsetting additional thread 90 from proximal portion threading 19 means that a plurality of threads may be engaged in the substrate 1 or 7 when anchor is fully installed. Moreover, offsetting of threads may cause proximal portion threading 19 and additional thread 90 to be generally diametrically opposed such that, when installed, there is at least one diameter at which anchor 10 engages substrate 1 or 7 on both sides, resulting in a more even distribution of force during loading and a stronger, more stable engagement of anchor 10. Without additional thread 90, when anchor 10 is installed in a thin substrate such as the face 7 of a hollow core door, proximal portion threading 19 may either not engage face 7 or may only engage face 7 on one side of anchor 10, resulting in a weaker, less stable engagement and, subsequently, a lower holding strength. In contrast, the addition of additional thread 90 has resulted in an anchor having a shear holding strength of about 100 lbs in drywall and about 200 lbs in a hollow core door.

Additional thread 90 may have a circumferential extent of between about ¼ turn and about ½ turns, preferably between about ¼ and about 1 turn, still more preferably between about ¼ and about ¾ turns. In one about embodiment, additional thread 90 may have a circumferential extent of about ½ turn such that terminal end 91 and leading end 92 may be generally diametrically opposed.

Terminal end 91 may be tapered, for example by rounding off terminal end 91 to have a generally semicircular shape or by other forms of tapering. Tapered terminal end 91 may allow root 93 of additional thread 90 to continue closer to flange 40, allowing for engagement with a greater amount of material, be it a friable material such as drywall 1 or a semi-rigid material such as a wood panel 7 in a hollow core door, increasing holding strength. At the same time, tapering limits the axial extent of a crest 94 of additional thread 90, such that crest 94 at terminal end 91 is further from flange 40 than it would otherwise be if terminal end 91 were not tapered. As a result, additional thread 90 is less likely to tear paper 49 on front surface 48 of drywall 1, which would both create an unsightly appearance on the surface 48 and reduce the holding strength of the anchor 10.

Leading end 92 of additional thread 90 may also be tapered from root 93 to crest 94. In contrast to semi-circular tapering of terminal end 91, additional thread 90 may begin at a point at leading end 92 and may gradually increase in thickness as it travels around body 12. Tapering of leading end 92 may allow additional thread to slice into semi-rigid material 7 or drywall 1 more quickly and easily with less resistance, thereby resulting in less disruption to the face of semi-rigid material 7 or paper 49 on surface 48 of drywall 1.

Leading end 92 may begin about halfway between turns of proximal portion thread 19 and may have generally the same pitch as proximal portion thread 19. In the embodiment in which additional thread 90 has a circumferential extent of about ½ turn, terminal ends 17 and 91 may be generally diametrically opposed and may be generally evenly axially spaced from flange 40. Terminal ends 17 and 91 may approximately axially overlie start of flared end 14. However, terminal ends 17 and 91 may continue onto flared end, reducing the length of neck 64. Terminal ends 17 and 91 may be spaced from flange 40 by between about ¹⁄₃₂ inch and about ⅛ inch, preferably about ¹⁄₁₆ inch. Terminal ends 17 and 91 may be spaced from flange 40 to minimize tearing or deformity of paper 49 of drywall surface 48 when used in drywall applications. Notably, however, terminal ends 17 and 91 should be spaced close enough to flange 40 to ensure that at least a portion of proximal portion thread 19 and additional thread 90 engage semi-rigid material 7 when used in that application.

Additional thread 90 may be generally helical. However, as shown in FIG. 2, additional thread 90, as well as external threading 19, 21, 23' and secondary threading 23" may have one or more flats 95, 96 where thread 90 deviates from a generally helical shape to extend generally parallel to axis 6. Due to its comparatively limited extent, additional thread 90 may only have one flat 95. Preferably, however, threads 19, 21, 23 and 23' have a plurality of flats 96. Still more preferably, flats 96 may be generally diametrically opposed. Even more preferably, threads 19, 21, 23' and 23"may have a flat 96 about every 180 degrees of rotation. Flats 95, 96 may have a circumferential extent of between about 30 degrees and about 90 degrees, preferably between about 45 degrees and about 75 degrees. Flats 95 and 96 increase surface area of threads 19, 21, 23', 23" and 90, which increases the amount of engagement between threads 19 and 90 with drywall 1 or semi-rigid material 7 or the area of compression between paper 51 on rear surface 50, thereby additionally increasing holding strength of anchor 10.

Flared End

Turning to FIGS. 1-4, flange 40 is located at flared end 14 of anchor 10 and includes an enlarged diameter FD with respect to drywall gripping threading root 26 to allow flange 40 to grip paper 49 on drywall front surface 48 or embed in semi-rigid material 7. In one embodiment, flange 40 has a flange diameter FD of between about ¼ inch and about ½ inch, preferably between about ⁵⁄₁₆ inch and about ⁷⁄₁₆ inch. Flange 40 also includes torque transmitting surfaces 15 so that anchor 10 can be rotated with a driver by the user. Flange 40 can include a recess 42 for receiving the tip of a driver 43, see FIG. 8, wherein recess 42 is configured for a particular kind of driver. In Recess 42 is a Phillips-type recess for receiving the tip of a Phillips-type driver.

Recess 42 has an effective diameter that is larger than the inner diameter of bore 8 to accommodate driver 43 so that anchor wall 38 is thinner at recess 42 than at other axial positions along anchor 10. Because all the torque that is experienced by anchor 10 tends to be concentrated at recess 42, flared end 14 can break off before anchor 10 has been fully driven, particularly if anchor 10 is being driven into a support member 2 because of the high torques required to drive anchor 10 into support member 2. In one embodiment, shown in FIG. 3, anchor 10 includes a widened wall 39 at recess 42 to form a hump 66 for reinforcing recess 42. Widened wall 39 of hump 66 extends along the entire axial length of recess 42 to fully support recess 42 during driving of anchor 10.

Flange 40 may have a diameter FD that is slightly smaller than the crest diameter DC of proximal portion threading 19. During installation, a flange that is larger than proximal portion threading 19 crest diameter DC contacts front surface 48 of drywall 1 or of semi-rigid material 7 when fully installed. At this point, a user may not realize that anchor 10 is fully installed and continue to try to drive anchor 10. However, larger flange may not embed itself in the mounting material but may spin at the surface, stripping out drywall 1 or some of the semi-rigid material 7, resulting in less material for engaging with threading 19 and 90, thereby weakening the hold of the anchor and its subsequent holding strength. In contrast, sizing flange 40 smaller than proximal portion threading 19 crest diameter DC allows flange to continue to embed itself in drywall 1 or semi-rigid material 7. This provides a visual cue to a user that anchor 10 has been fully or over installed, at which point a user can cease driving anchor 10, maintaining its higher holding strength.

Most drywall 1 currently in use is either ½ inch or ⅝ inch thick, therefore it is preferred that the length DL of proximal portion 18, including flange 40, be between about ⁷⁄₁₆ inch and about ¾ inch, preferably about ½ inch.

In one embodiment, proximal portion 18 has a crest diameter DC of between about ⅓ inch and about ½ inch, preferably between about ⅜ inch and about ½ inch, and in one embodiment about ⁷⁄₁₆ inch, a root diameter DR near flange 40 of between about ⅛ inch and about ⁵⁄₁₆ inch, preferably about ¼ inch, a thread height TH of between about 0.075 inch and about 0.14 inch, preferably about ⅛ inch, and root 26 of proximal portion 18 tapers toward intermediate portion 20 at an angle with respect to axis 6 of between about ½ degree and about 3 degrees, preferably about 1 degree on each side of proximal portion 18.

Intermediate portion 20 of anchor 10 can have a crest diameter MC near proximal portion 18 of between about 0.26 inch and about 0.35 inch, preferably about 0.28 inch, a root diameter MR near proximal portion 18 of between about 0.2 inch and about ¼ inch, preferably about 0.035 inch, a thread height MH of between about 0.01 inch and about 0.075 inch, preferably about 0.035 inch, and root 28 of intermediate portion 20 tapers toward distal portion 22 at an angle with respect to axis 6 of between about 1 degree and about 4 degrees, preferably about 2¼ degrees. In one embodiment, shown in FIG. 2, the angle which proximal portion root 26 tapers is substantially equal to the angle which intermediate portion root 28 tapers.

Distal portion 22 of anchor 10 can have a maximum crest diameter TC of between about 0.23 inch and about 0.26 inch, preferably about 0.24 inch, a maximum root diameter TR of between about 0.18 inch and about 0.22 inch, preferably about 0.2 inch, a thread height TH of between about 0.02 inch and about 0.07 inch, preferably about 0.035 inch, and drilling threading root 30 tapers toward drilling tip 16 at an angle with respect to axis 6 of between about 10 degrees and about 20 degrees, preferably 15 degrees. The total length ML of intermediate portion 20 and distal portion 22 can be between about ⅜ inch and about ⅝ inch, preferably about ½ inch.

While the foregoing written description of the invention enables one of ordinary skill to make and use what is considered presently to be the best mode thereof, those of ordinary skill will understand and appreciate the existence of variations, combinations, and equivalents of the specific exemplary embodiments and methods herein. The invention should therefore not be limited by the above described embodiments and methods, but by all embodiments and methods within the scope and spirit of the invention as claimed.

What is claimed is:

1. A self-drilling anchor for use in either a friable or semi-rigid material, comprising:
   a body having an axis, an axial bore adapted to receive a fastener, a proximal end, a drilling end, a proximal portion adjacent said proximal end having high threading having a crest diameter for engaging said friable or semi-rigid material, and a drilling portion adjacent said drilling end;
   an additional thread proximate said proximal end, said additional thread continuing between turns of said high threading; and
   a head at said proximal end having an outer diameter that is smaller than said crest diameter;
   wherein said additional thread has a thread height substantially similar to a thread height of said high threading; and
   wherein said additional thread has a leading end, a terminal end and a circumferential extent of about 180 degrees.

2. A self-drilling anchor according to claim 1, wherein said high threading has a terminal end and said high threading terminal end and said additional thread terminal end are offset by about 180 degrees.

3. A self-drilling anchor according to claim 1, wherein said high threading has a terminal end and said high threading terminal end and said additional thread terminal end are substantially similarly spaced from an upper surface of said head.

4. A self-drilling anchor according to claim 3, wherein said high threading terminal end and said additional thread terminal end are spaced about 1/16 inch from said upper surface.

5. A self-drilling anchor according to claim 1, wherein said additional thread has a flat extending generally parallel to said axis.

6. A self-drilling anchor according to claim 5, wherein said high threading has a flat extending generally parallel to said axis.

7. A self-drilling anchor according to claim 5, wherein said additional thread flat and said high threading flat are generally axially aligned.

8. A self-drilling anchor according to claim 5, wherein said high threading has a plurality of generally axially aligned flats.

\* \* \* \* \*